(12) United States Patent
Park et al.

(10) Patent No.: US 10,408,928 B2
(45) Date of Patent: Sep. 10, 2019

(54) USER TERMINAL DEVICE AND METHOD FOR RECOGNIZING LOCATION OF USER

(71) Applicant: SAMSUNG ELECTRONICS CO., LTD., Suwon-si, Gyeonggi-do (KR)

(72) Inventors: Min-ji Park, Gwangmyeong-si (KR); Ji-hun Ha, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/768,203

(22) PCT Filed: Jun. 24, 2016

(86) PCT No.: PCT/KR2016/006751
§ 371 (c)(1),
(2) Date: Apr. 13, 2018

(87) PCT Pub. No.: WO2017/065383
PCT Pub. Date: Apr. 20, 2017

(65) Prior Publication Data
US 2018/0313944 A1    Nov. 1, 2018

(30) Foreign Application Priority Data
Oct. 15, 2015  (KR) .................. 10-2015-0144088

(51) Int. Cl.
*H04W 24/00*  (2009.01)
*G01S 11/06*  (2006.01)
(Continued)

(52) U.S. Cl.
CPC .............. *G01S 11/06* (2013.01); *H04W 4/02* (2013.01); *H04W 4/025* (2013.01); *H04W 64/00* (2013.01); *H04W 88/02* (2013.01); *H04W 4/80* (2018.02)

(58) Field of Classification Search
CPC .. H04L 29/08657; H04W 4/02; H04W 4/029; H04W 64/00; H04W 4/024
See application file for complete search history.

(56) References Cited

U.S. PATENT DOCUMENTS

| 7,843,333 B2 | 11/2010 | Angelhag et al. |
| 2008/0181172 A1* | 7/2008 | Angelhag ................ G01S 5/14 370/328 |

(Continued)

FOREIGN PATENT DOCUMENTS

| JP | 2006-217390 | 8/2006 |
| KR | 10-2012-0022539 | 3/2012 |
| KR | 10-2015-0107794 | 9/2015 |

OTHER PUBLICATIONS

International Search Report for PCT/KR2016/006751, dated Oct. 4, 2016, 4 pages.

*Primary Examiner* — Shantell L Heiber
(74) *Attorney, Agent, or Firm* — Nixon & Vanderhye, P.C.

(57) ABSTRACT

A user terminal device and a method for recognizing a user location using beacon signals of things are provided. The user terminal device for recognizing the user location includes a communication module configured to receive beacon signal information from things grouped into a plurality of space groups; and a processor configured to identify as a user location in a user space, a space group to which a thing corresponding to a beacon signal having a received signal strength indicator (RSSI) of more than a reference value form among RSSIs of beacon signals belongs, based on the beacon signal information. With this, the user terminal device may analyze the beacon signals of the things to recognize the user location in the user space, thereby controlling the things to be optimized for the user.

13 Claims, 16 Drawing Sheets

(51) Int. Cl.
  *H04W 4/02*   (2018.01)
  *H04W 64/00*  (2009.01)
  *H04W 88/02*  (2009.01)
  *H04W 4/80*   (2018.01)

(56) References Cited

U.S. PATENT DOCUMENTS

| | | |
|---|---|---|
| 2008/0218334 A1 | 9/2008 | Pitchers et al. |
| 2013/0082827 A1 | 4/2013 | Cho et al. |
| 2014/0134948 A1 | 5/2014 | Ghose et al. |
| 2014/0244834 A1* | 8/2014 | Guedalia ................ H04L 67/16 709/224 |
| 2015/0019342 A1* | 1/2015 | Gupta .................... G06Q 10/20 705/14.66 |
| 2015/0019714 A1* | 1/2015 | Shaashua ................ H04W 4/70 709/224 |
| 2015/0124630 A1 | 5/2015 | Ozer et al. |

* cited by examiner

FIG. 6

```
NEW THING 1 (TV 1) WAS FOUND.
IF YOU WANT TO SET GROUP, PLEASE SELECT DESIRED GROUP
(ONLY ONE SELECTION POSSIBLE)
```

| | | |
|---|---|---|
| | YES | |
| 1. CLOSE GROUP: ROOM A | ☐ ESSENTIAL OPERATION<br>▣ OPTIONAL OPERATION | |
| 2. CLOSE GROUP: LIVING ROOM | ☐ ESSENTIAL OPERATION<br>☐ OPTIONAL OPERATION | NO |
| 3. CLOSE GROUP: BATHROOM B | ☐ ESSENTIAL OPERATION<br>☐ OPTIONAL OPERATION | |

FIG. 7

DO YOU WANT TO SET EXCLUDING DIRECTIONS IN
IDENTIFYING USER LOCATION BY THING 1 (TV 1)?
(MULTIPLE SELECTION POSSIBLE)

YES   NO

FIG. 8

PLEASE SELECT APPROACH EXCLUDING DIRECTIONS.
(MULTIPLE SELECTION POSSIBLE)

| 1 DIRECTION : FROM ROOM A | ■ CONFIRMATION |
| 2 DIRECTION : FROM ROOM B | ☐ CONFIRMATION |
| 3 DIRECTION : FROM ROOM C | ☐ CONFIRMATION |
| 4 DIRECTION : FROM KITCHEN | ☐ CONFIRMATION |
| 5 DIRECTION : FROM BATHROOM A | ☐ CONFIRMATION |
| 6 DIRECTION : FROM BATHROOM B | ☐ CONFIRMATION |
| 7 DIRECTION : FROM UTILITY ROOM | ☐ CONFIRMATION |

FIG. 11

| GROUP NAME | THING NAME | RSSI(dBm) |
|---|---|---|
| ROOM A | THING 1 | -86 |
| | THING 2 | -90 |
| LIVING ROOM | THING 3 | -76 |
| | THING 4 | -70 |
| KITCHEN | THING 5 | -51 |
| | THING 6 | -48 |
| | THING 7 | -54 |
| ROOM B | THING 8 | -45 |
| | THING 9 | -45 |
| ROOM C | THING 10 | -42 |
| | THING 11 | -40 |
| BATHROOM A | THING 12 | -75 |
| BATHROOM B | THING 13 | -75 |
| UTILITY ROOM | THING 14 | -39 |
| | THING 15 | -38 |

FIG. 13

| GROUP NAME | THING NAME | RSSI | INCREASE AND DECREASE(dBm) |
|---|---|---|---|
| ROOM A | THING 1 | -80 | -6 |
| | THING 2 | -84 | -6 |
| LIVING ROOM | THING 3 | -87 | +11 |
| | THING 4 | -80 | +10 |
| KITCHEN | THING 5 | -53 | +2 |
| | THING 6 | -50 | +2 |
| | THING 7 | -56 | +2 |
| ROOM B | THING 8 | -43 | -2 |
| | THING 9 | -43 | -2 |
| ROOM C | THING 10 | -45 | +3 |
| | THING 11 | -43 | +3 |
| BATHROOM A | THING 12 | -70 | -5 |
| BATHROOM B | THING 13 | -70 | -5 |
| UTILITY ROOM | THING 14 | -40 | +1 |
| | THING 15 | -40 | +2 |

(12) United States Patent — US 10,408,928 B2

USER TERMINAL DEVICE AND METHOD FOR RECOGNIZING LOCATION OF USER

This application is the U.S. national phase of International Application No. PCT/KR2016/006751 filed Jun. 24, 2016, which designated the U.S. and claims priority to KR Patent Application No. 10-2015-0144088 filed Oct. 15, 2015, the entire contents of each of which are hereby incorporated by reference.

TECHNICAL FIELD

Apparatuses and methods consistent with exemplary embodiments relate to a user terminal device, which recognizes a location of a user located in the same space as that of a plurality of things connected to network in a user space, and a method thereof.

BACKGROUND ART

With development of information and communication technology, an internet of things (IoT) has become more widespread. An IoT environment refers to an environment in which all things are connected to internet using all sorts of communication technologies. In this environment, things around user all may communicate via the internet.

In a smart space (for example, a smart home), devices, such as a television (TV), a refrigerator, a bulb and the like, are connected to the internet. The user may give commands to the devices existing in the smart space via smart phone or smart remote controller to operate or manipulate the devices.

When the user uses IoT devices (internet-capable things), she or he generally uses a dedicated application installed in smart phone to check up a list for IoT devices currently existing in the home and to control the IoT devices.

If the user searches things existing in the home, she or he may first check up a list for all of the things existing in the home regardless of room structure. If the user wants to receive IoT service in a specific room, there is inconvenience in that she or he should select desired things one by one from the searched list and make a group based on the selected things.

Also, from among things usable in the home, several same products, such as smart bulbs and the like, may exist. In this case, as a result of the search for the things existing in the home, a plurality of same smart bulbs will be displayed in the searched list. However, it may be very difficult for the user to select smart bulbs existing in a room she or he wants.

DISCLOSURE

Technical Problem

In order to address the related art problem as described above, apparatuses and methods consistent with exemplary embodiments provides a user terminal device, which allows a user to conveniently group a plurality of things connected to network in a user space into a plurality of space groups, and a method thereof.

Further, apparatuses and methods consistent with exemplary embodiments provides a user terminal device, which can recognize a location of a user in a user space in which there are things grouped into a plurality of space groups, and a method thereof.

Also, apparatuses and methods consistent with exemplary embodiments provides a user terminal device, which when a user moves in a house, can recognize a location of a user and automatically or selectively control things belonging to the recognized location, and a method thereof.

Technical Solution

In accordance with an aspect of an exemplary embodiment, there is provided a user terminal device for recognizing a user location including: a communication module configured to receive beacon signal information from things grouped into a plurality of space groups; and a processor configured to identify as a user location in a user space, a space group to which a thing corresponding to a beacon signal having a received signal strength indicator (RSSI) of more than a reference value form among RSSIs of a plurality of beacon signals received from a plurality of things belongs, based on the beacon signal information.

The reference value may be set to be different according to an area of the space group to which the thing corresponding to the beacon signal with the RSSI of more than reference value belongs.

The user terminal device may further include a display, and the processor may be configured to, in response to a beacon signal with a RSSI of more than a given size being received from a non-grouped thing, display on the display, information on a space group to which at least one thing adjacent to the non-grouped thing belongs in order to group the non-grouped thing.

The user terminal device may further include a user interface (UI) generator, which generates a UI for selecting the space group in order to group the non-grouped thing.

The processor may be configured to identify a layout for things in the user space based on changes in RSSI of beacon signals of the things, which are changed according to user movement.

The processor may be configured to identify a direction of the user movement between the space groups based the changes in RSSI of beacon signals.

The UI generator may be configured to generate a UI for setting up at least one direction to be excluded in identifying the user location from among a plurality of directions where the user approaches the things.

The communication module may include one of a Bluetooth communication module, a Zigbee communication module, a wireless fidelity (WiFi) communication module, or Home radio frequency (HomeRF) communication module.

The user terminal may include a portable mobile device.

The beacon signal information may be received via a portable beacon collecting device.

The processor is configured to control at least one of things belonging to the space group of the identified user location.

The user terminal device may further include a storage, and the processor may be configured to store in the storage, thing status information of the space group in which the user are located, according times and users.

When the user in a new space group according to the user location identification, the processor may be configured to provide the user with information on things in the new space group.

The UI generator is configured to generate a UI for setting up essential control things and optional control things.

The processor may be configured to control the things according to a user of priority in response to locations of a plurality of users being identified at the same time.

In accordance with an aspect of another exemplary embodiment, there is provided a thing controlling system for controlling things according to a user location, including: a mobile device having a first communication module configured to receive beacon signal information from things grouped into a plurality of space groups; and a user terminal device having a processor configured to identify as a user location in a user space, a space group to which a thing corresponding to a beacon signal having a received signal strength indicator (RSSI) of more than a reference value form among RSSIs of a plurality of beacon signals received from a plurality of things belongs, based on the beacon signal information, and to transmit a control signal for operating things in the space group in which a user is located.

In accordance with an aspect of further another exemplary embodiment, there is provided a method for recognizing a user location, including: grouping a plurality of things according to space groups in a user space; collecting beacon signals from the plurality of things; and identifying as a user location in a user space, a space group to which a thing corresponding to a beacon signal having a received signal strength indicator (RSSI) of more than a reference value form among RSSIs of the beacon signals belongs.

The method may further include controlling things in the space group in which a user is located according to the user location identification.

The grouping may include, in response to a RSSI of a beacon signal received from a non-grouped thing being a given size, providing the user with information on at least one space group to which at least one adjacent grouped thing belongs.

In accordance with an aspect of other exemplary embodiment, there is provided a recording medium including a program, which collects beacon signals of things grouped into a plurality of space groups and identifies as a user location, a space group to which a thing corresponding to a beacon signal having a received signal strength indicator (RSSI) of more than a reference value form among the collected beacon signals belongs.

Advantages Effects

As described above, according to the exemplary embodiments, the user terminal device may allow the user to naturally and conveniently group the things without intentionally and individually finding out the things to group the things. Even if interior structures or thing locations are changed, the user terminal device may automatically update new group information through configurations of surrounding things located in the same space.

Also, according to the exemplary embodiments, the user terminal device may identify indoor locations of subjects and provide the user with IoT service optimized for her or him locations based the identified indoor locations.

DESCRIPTION OF DRAWINGS

FIGS. 6, 7, and 8 are views illustrating user interfaces (UIs) provided to a user in the process of grouping the things as illustrated in FG. 5, respectively;

FIG. 11 is a table illustrating received signal strength indicators R(RSSIs) of beacon signals of the things collected in the user space;

FIG. 13 is a table illustrating the changes in RSSI of the beacon signals of the things according to the user movement in the user space;

BEST MODE

Figure 1:
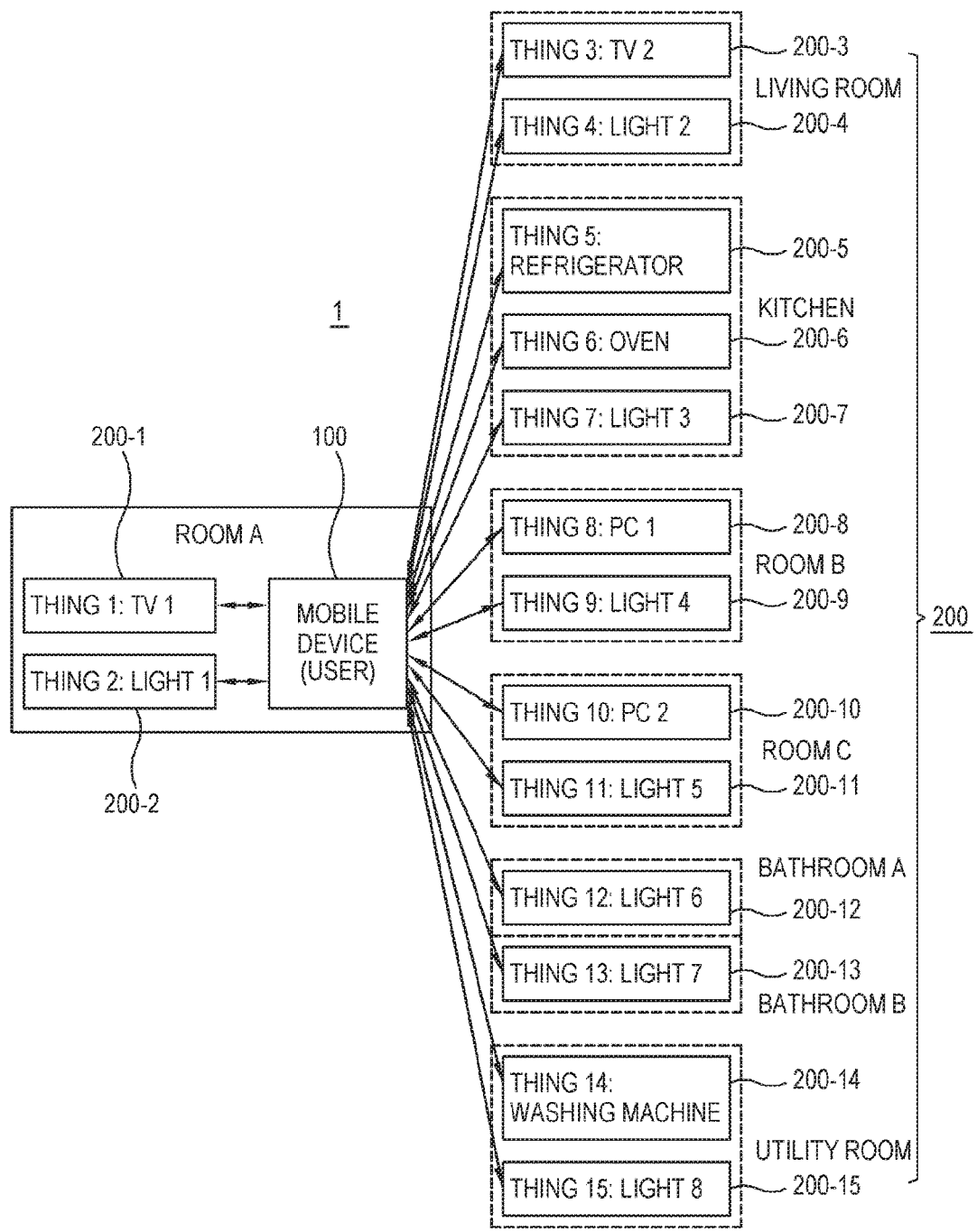
FIG. 1 is a mimetic diagram illustrating configuration of IoT according to a first exemplary embodiment.

Below, exemplary embodiments will be described in detail with reference to accompanying drawings. However, it should be understood that the following description with reference to the accompanying drawings is not provided to limit specific exemplary embodiments of the present disclosure, and various changes and modifications, equivalents and/or alternatives of the various exemplary embodiments of the present disclosure described herein can be made. Also, similar elements may be represented by similar reference numerals throughout the whole drawings as far as possible.

In the following description, if terms, such as "have", "may have", "include", "may include" and the like, are used, those terms are used for the purpose of indicating that corresponding features (for example, elements, such as numerical values, functions, operations, parts or combinations thereof) exist, and not for the purpose of excluding the possibility that more than one other feature exists or is added.

In the following description, if phrases, such as "A or B", "at least one of A or/and B", "one or more of A and/or B" and the like, are used, those phrases are used for the purpose of indicating all possible combinations of listed elements. For example, "A or B", "at least one of A and B", or "at least one of A or B" may refer to including all of (1) at least one A, (2) at least one B, or (3) both at least one A and at least one B.

In the following description, if terminologies, each of which includes such an ordinal number as "first", "second", "primary", "secondary" and the like, are used, those terminologies are used merely to describe various elements regardless of order and/or importance and do not limit the elements. The terminologies are only used for the purpose of discriminating one element from other elements. For example, a first user device and a second user device may merely represent user devices different from each other regardless of order and/or importance. In other words, a first element is named as a second element and vice versa without departing from the scope of the present disclosure.

In the following description, if an element (for example, a first element) is described as being (operatively or communicatively) coupled with/to or connected to another element (for example, a second element), it should be understood that the former may be connected to the latter directly or through other element (for example, a third element). On the other hand, if an element (for example, a first element) is described as being directly coupled with/to or directly connected to another element (for example, a second element), it may be understood that there is no other element (for example, a third element) between the former and the latter.

In the following description, if phrases, such as "configured (or set) to ~" and the like, are used, those phrases may be used being replaced by "suitable for ~", "having the capacity to ~", "designed to ~", "adapted to ~", "made to ~, "capable of ~" or the like as occasion commands. The phrase "configured (or set) to ~" may not always mean only "specifically hardware-designed to ~". In some cases, an expression "a device configured to ~" may mean the device is "capable of" doing something with other device or part. For example, a phrase "a processor configured (or set) to perform A, B and C" may mean a dedicated processor (for example, embedded processor) for performing those operations or a generic-purpose processor (for example, a central processing unit (CPU) or an application processor) capable of performing those operations by executing more than one software program stored in a memory device.

The terms and words used in the following description and claims are used only in terms for explaining the exemplary embodiments described herein in the best way and may not intend to limit the scope of other exemplary embodiments. If terms, each of which is in the singular, are used, those terms may be interpreted to include the plural unless the context expressly otherwise requires. All terms and words including technical or scientific terminologies used in the following description and claims may have the same meanings as those generally comprehended by those of ordinary skill in the art of the present disclosure. Terms and words defined in a general use dictionary may be interpreted as having the same or similar meanings as contextual meanings conforming to related technologies and are not ideally or excessively interpreted as formal meanings unless expressly specified otherwise. As occasion demands, even if terms and words are expressly defined in the following description and claims, those terms and words may be not interpreted to exclude the exemplary embodiments described herein.

An internet of things (IoT) 1 includes a plurality of things for use convenience of residents or users (hereinafter, referred to a 'user') in a specific user space, such as a home, a structure, a building, an office and the like. Of course, besides the home, the structure, the building, the office and the like, a plurality of things for use convenience of the user may be installed in a hypethral park or the like. The IoT 1 refers to a technology where constituted things, for example, a TV, a light, a personal computer (PC), a washing machine, an oven, an automobile, a vending machine, a display, etc. are connected to network to communicate one another and actively interact with one another via intelligence interfaces.

FIG. 1 is a mimetic diagram illustrating configuration of IoT 1 according to a first exemplary embodiment. In FIG. 1, the IoT 1 is configured, so that things used by residents in a house, which is user's residential space, are connected via communication network. In a room A are installed a thing 1 (TV 1) and a thing 2 (light 1), in a living room are installed a thing 3 (TV 2) and a thing 4 (light 2), in a kitchen are installed a thing 5 (refrigerator), a thing 6 (oven) and a thing 7 (light 3), in a room B are installed a thing 8 (PC 1) and a thing 9 (light 4), in a room C are installed a thing 10 (PC 2) and a thing 11 (light 5), in a bathroom A is installed a thing 12 (light 6), in a bathroom B is installed a thing 13 (light 7), and in a utility room are installed a thing 14 (washing machine) and a thing 15 (light 8). These things are connected with one another via the communication network. A server, a hub or a control device of the IoT 1 in the house is implemented as a portable mobile device 100. The mobile device 100 includes a mobile phone, a notebook PC, a tablet PC, a personal digital assistance (PDA), a smart watch, etc. The user uses the things while moving between space groups, for example, the rooms A, B and C, the living room, the kitchen, the bathrooms A and B, and the utility room in the house with the mobile device 100 in tow. When the user moves between the space groups It is necessary to essentially or selectively control specific things. For example, since it is dark at night, if the user is asleep and then wakes up, it needs to automatically turn on the light (thing 2) in the room A where the she or he is currently located, and then if she or he approaches the kitchen, to automatically turn on the light (the thing 7) in the kitchen after being identified whether it is dark time. If necessary, the user may select and operate the oven (the thing 6) in the kitchen. In other words, the user may use the mobile device 100 (hereinafter, referred to a user terminal device 100) to turn on and then to variously control optional control things. Of course, the optional control things may be controlled via a user interface (UI), which as soon as she or he moves to the same space group as that of the optional control things, inquiries of the user whether to operate the optional control things, or remotely and arbitrarily in different space group.

Figure 2:
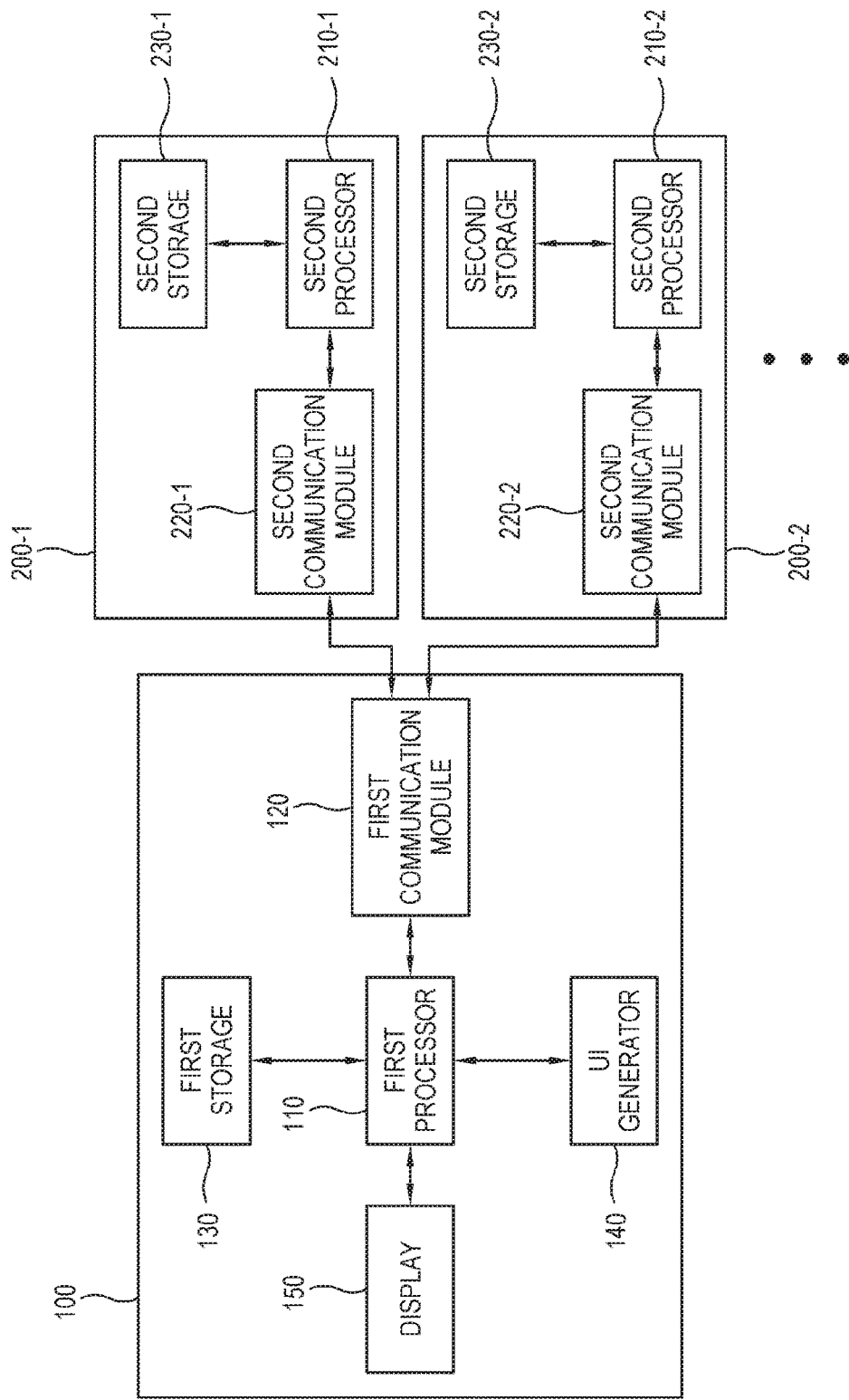
FIG. 2 is a block diagram illustrating configurations of devices illustrated in FIG. 1.

FIG. 2 is a block diagram illustrating devices constituting the IoT 1. The IoT 1 includes things 1 to 15 connected to network to communicate with one another, and a user terminal device 100.

Beacon signals are signals, which are periodically transmitted from second communication modules 220-1, 220-1, mounted in the things 200-1, 200-2, . . . . Information included in the beacon signals, for example, an ibeacon, includes a universally unique identifier (UUID), a major identifier (ID), a miner ID, and a received signal strength indicator (RSSI). The UUID is an identifier predetermined in an order of 15 digits, hexadecimal number system and number, which is randomly determined. The major ID is an identifier for identifying the same UUID. The miner ID is an identifier for identifying the same UUID and the major ID. The RSSI as an indicator of the beacon signals transmitted from the second communication modules 220-1, 220-1, . . . mounted in the things 200-1, 200-2, . . . is represented as, generally, −35~99 dBm. Substantially, the RSSI is measured as a value in which a required signal strength C, a total amount of interference signal I and a noise N are totaled up. Measuring distances between the user terminal device 100 and the things 200-1, 200-2, . . . only by the RSSI causes errors. Accordingly, the present disclosure is based upon the premise that the user carries the user terminal device 100 to receive the beacon signals, RSSIs received by the user terminal device 100 in similar interference signal I and noise N environment are compared, and the user is close to a thing from which a beacon signal having a RSSI of more than a reference value is transmitted. The user space, such as the house includes a plurality of space groups divided by thick walls. Even if the thick walls reduce the RSSI of the beacon signals, it does not influence if selecting spaces groups to which the things corresponding to the beacon signals having the RSSI of the more than reference value belong.

The user terminal device 100 may receive beacon signals from the things 200-1, 200-2, . . . and transmit control signals to the things 200-1, 200-2, . . . to operate the things 200-1, 200-2, . . . . The user terminal device 100 includes a first processor 110, a first communication module 120, a first storage 130, a UI generator 140 and a display 150. The user terminal device 100 may include additional components, such as a signal processor, a user input, and the like, besides the above described components.

The first processor 110 is implemented as a control board in which includes a central processing unit (CPU), a micro processing unit (MPU), application specific integrated circuits (ASICs), digital signal processors (DSPs), digital signal processing devices (DSPDs), programmable logic devices (PLDs), field programmable gate arrays (FPGAs), micro-controllers, microprocessors, etc. The first processor 110 may control general operations of the above described components, i.e., the first communication module 120, the first storage 130, the UI generator 140, the display 150, etc., and software or hardware-process all sorts of beacon signals and the like received from, inputted from and sensed by external apparatus, for example, the things via communication or network. The first processor 110 may include an operating system (OS), such as, for example, an android version 5.0 (Lollipop). Also, the first processor 110 includes an application (program), which collects RSSIs of beacon signal information transmitted by the things 200 to identify user location in the user space. The first processor 110 may identify user location in the user space corresponding to a spaces group to which a thing having a beacon signal having the RSSI of the more than reference value belongs, and control the things located in the corresponding spaces group. If identifying that the user is in, for example, the room A with the user terminal device 100 in tow, the user terminal device 100 may control the TV installed in the room A or provide information to the TV, thereby allowing the TV to provide service suited to the user.

The first communication module 120 receives beacon signals from all the things 200-1, 200-2, . . . in the user space and transmits information including control signals to all the things 200-1, 200-2, . . . . The first communication module 120 is implemented as a wireless fidelity (WiFi) communication module, a Bluetooth communication module, a Zigbee communication module, a home radio frequency (HomeRF) communication module, etc. In addition, the first communication module 120 may be implemented as a short-range communication module, such as a radio frequency identification (RFID), an infrared data association (IrDA), an ultra wideband (UWB), etc.

The first storage 130 stores unlimited data. The first storage 130 is accessed by the first processor 110, which in turn performs reading, writing, modifying, deleting, or updating the data. The data stored in the first storage 130 includes, for example, collected RSSI information of the beacon signals of the things, grouping information for the things, information for grouped things, layout information for grouped things, control information for things according user locations, directions excluded in identifying user location, etc. Of course, the first storage 130 stores an OS, and various applications, image data, additional data, etc., which are executable on the OA. The first storage 130 includes a program (application), which compares RSSIs of the beacon signals collected from the things and identifies as user location in the user space, a space group to which a thing corresponding to a beacon signal having the largest RSSI within a range of a preset reference value belongs.

The first storage 130 may include a storing medium having at least one type of a flash memory type, a hard disk type, a multimedia card micro type, a card type (for example, a SD memory, a XD memory or the like), a random access memory (RAM) a static random access memory (SRAM), a read-only memory (ROM), an electrically erasable programmable read-only memory (EEPROM), a programmable read-only memory (PROM), a magnetic memory, a magnet disc, or an optical disc.

The UI generator 140 identifies whether RSSI of a beacon signal of a non-grouped thing exceeds a preset size referring to the USSIs of the beacon signals received from the things 200-1. 200-2, . . . and if exceeding, generates a UI, which inputs whether to group the non-grouped thing.

If it is identified that the non-grouped thing is grouped, the UI generator 140 generates a UI, which inputs whether a control for the corresponding thing is essential or optional.

If the user location is identified, the UI generator 140 generates a UI, which checks a selection for thing to be optionally controlled, which is in the space group where the user is located.

If it is identified that the non-grouped thing is grouped, the UI generator 140 generates a UI, which determines user approaching directions excluded in identifying the user location, for example, directions divided by walls to block access. A criterion for directions is directions, which approach the corresponding thing from locations in other space groups.

The display 150 displays information with which provides the user. The display 150 is implemented as a liquid crystal display (LCD), a light emitting diode (LED) display, etc. The information provided for the user via the display 150 includes information for things, group information for things, various UIs generated by the UI generator 140, layout distribution for space groups, all sorts of control function keys (buttons) of things, etc.

The things 200-1, 200-2, . . . should be basically configured to be electrically controllable. The things 200-1, 200-2, . . . include second processors 210-1, 210-2, . . . , second communication modules 220-1, 220-2, . . . , and second storages 230-1, 230-2, . . . , respectively. The things 200-1, 200-2, . . . may be implemented in various type, and have the same components or different components. Accordingly, only one thing 200-1 and common components will be described below.

The second processor 210-1 is implemented as a control board in which includes a CPU, a MPU, ASICs, DSPs, DSPDs, PLDs, FPGAs, micro-controllers, microprocessors, etc. The second processor 210-1 controls general operations for all sorts of components of the thing 200-1, for example, the second communication module 220-1 and the second storage 230-1. Of course, the second processor 210-1 may control different components, which are not described herein. The second processor 210-1 controls the second communication module 220-1 to periodically transmit beacon signals, and receives information including control signals from the user terminal device 100 to control functions of the things 200-1.

The second communication module 220-1 receives control signals and beacon signals from the user terminal device 100 and other things 220-2, 220-3, . . . in the user space and transmits beacon signals to the user terminal device 100 and the other things 220-2, 220-3, . . . . The second communication module 220-1 is implemented as a WiFi communication module, a Bluetooth communication module, a Zigbee communication module, a HomeRF communication module, etc. In addition, the second communication module 220-1 may be implemented as a short-range communication module, such as an RFID, an IrDA, a UWB, etc.

The second storage 230-1 stores unlimited data. The second storage 230-1 is accessed by the second processor 210-1, which in turn performs reading, writing, modifying, deleting, or updating the data. The data stored in the second storage 230-1 includes IDs (UUID, major ID, and minor ID) for the thing 200-1, group information for the thing 200-1, user identification information, user terminal device-identification information, etc. Of course, the second storage 230-1 stores an OS, and various applications, image data, additional data, etc., which are executable on the OA.

The second storage 230-1 may include a storing medium having at least one type of a flash memory type, a hard disk type, a multimedia card micro type, a card type (for example, a SD memory, an XD memory or the like), a RAM, a SRAM, a ROM, an EEPROM, a ROM, a magnetic memory, a magnet disc, or an optical disc.

Figure 3:
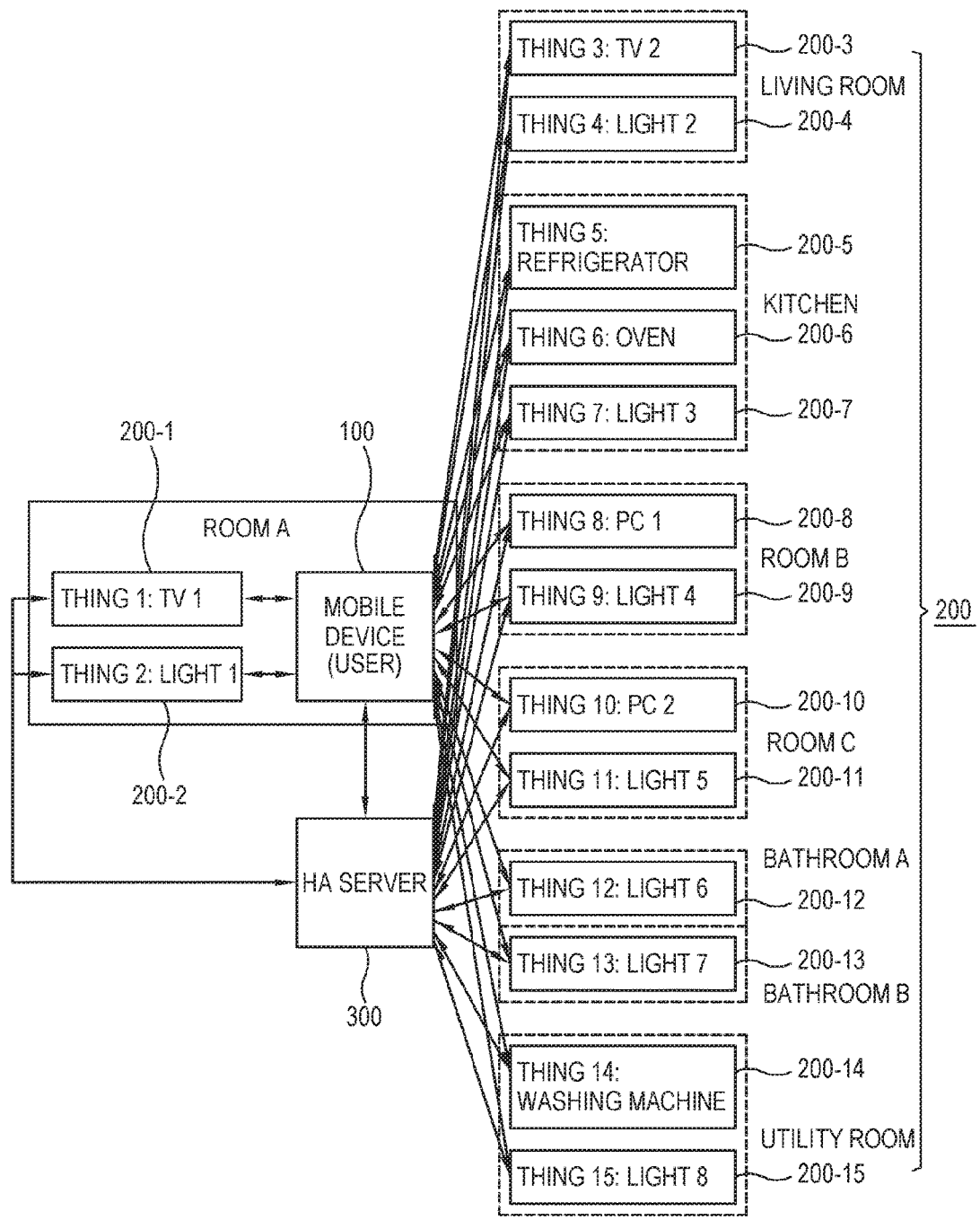
FIG. 3 is a mimetic diagram illustrating configuration of IoT according to a second exemplary embodiment.

FIG. 3 is a mimetic diagram illustrating configuration of IoT 1 according to a second exemplary embodiment and the IoT 1 includes a wearable device 300, things 400-1, 400-2, . . . , and a home automation (HA) server 500.

In the IoT 1 illustrated in FIG. 2, the user terminal device 100 functions not only to collect the beacon signals of the things, but also to identify user location to control the things. Here, since the user terminal device 100 includes all of function to collect the beacon signals, function to analyze the collected beacon signals, and function to control the things, the user terminal device 100 needs to be implemented as a high performance mobile device, such as a smart phone. However, the user does not generally carry the smart phone in an activity space, such as user's residential space. Accordingly, the wearable device 300, such as a smart watch and a portable beacon receiving device, which is suited to carry at all times, simply collects beacon signals information of the things to transmit to the HA server 500, which is a high performance device, and the HA server 500 analyses RSSI information of the received beacon singles and user location according thereto and controls the things using the analyzed results. Of course, both the wearable device 300 and the HA server 500 may collect and analyze beacon signals from the things to control the things at the same time. Also, a plurality of wearable devices 300 may collect and analyze beacon signals from the things to control the things at the same time. However, it is preferably that a priority for control of the things is preset with respect to users. For example, if when a user A stays in the living room with a user terminal A in tow, a user B approaches the living room with a user terminal B in tow, it is preferable to preset whether the things should be controlled on the basis of the current user A or the new user B. The portable beacon receiving device may be designed to be attachable to accessories, such as glasses, clothes, belts, shoes, etc.

Figure 4:
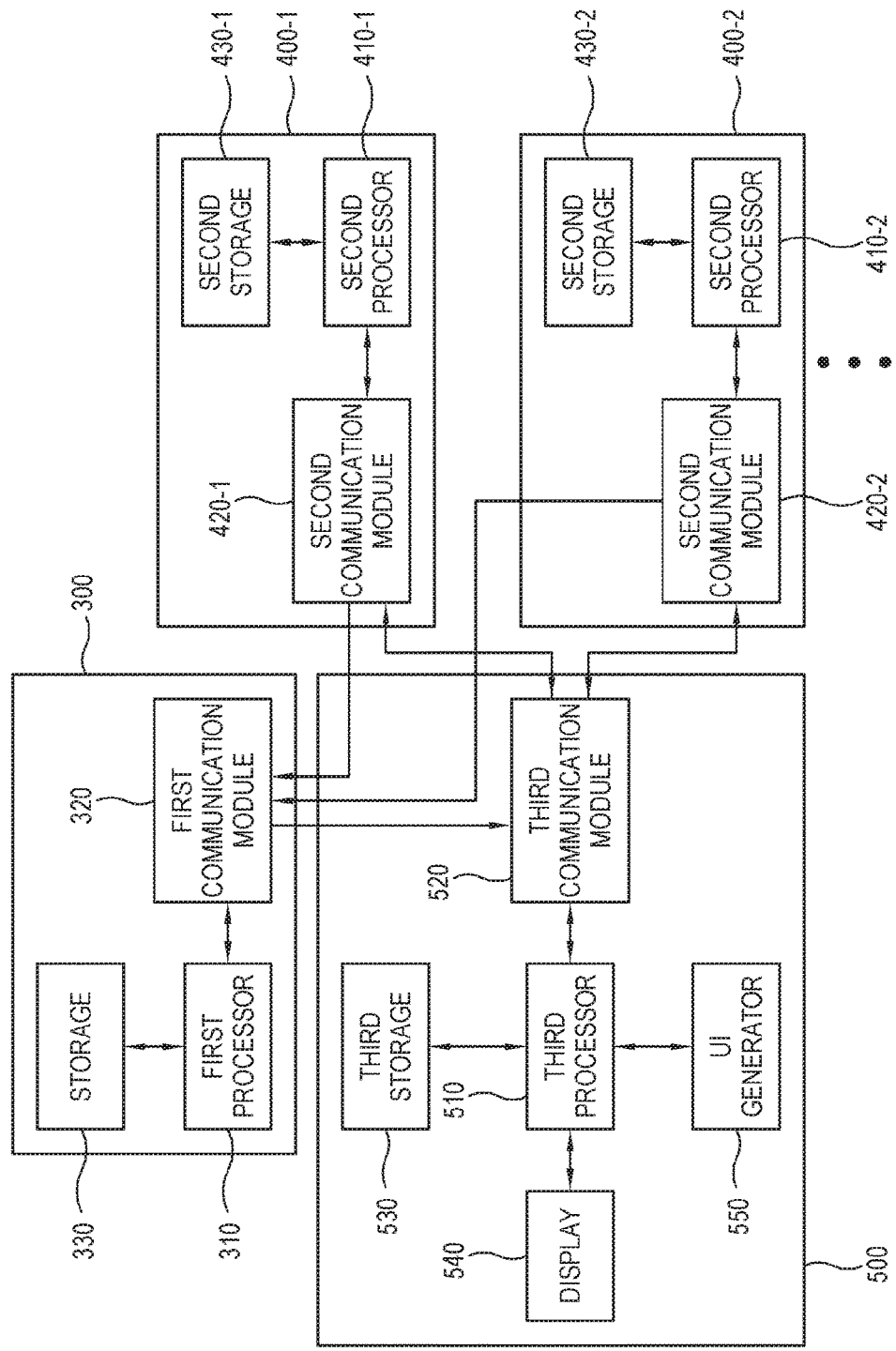
FIG. 4 is a block diagram illustrating configurations of devices illustrated in FIG. 3.

FIG. 4 is a block diagram illustrating configurations of devices illustrated in FIG. 3, which include a wearable device 300, things 400-1, 400-2, . . . and a HA server 500.

The wearable device 300 may receive beacon signals from the things 400-1, 400-2, . . . and transmit the received beacon signals to the HA server 500. The wearable device 300 includes a first processor 310, a first communication module 320, and a first storage 330. Of course, the wearable device 300 may include other additional components, such as a display, a UI generator and the like.

The first processor 310 is implemented as a control board in which includes a CPU, a MPU, ASICs, DSPs, DSPDs, PLDs, FPGAs, micro-controllers, microprocessors, etc. The first processor 310 may control general operations of the above described components of the wearable device 300, i.e., the first communication module 320, the first storage 230, etc.

If having function to analyze received beacon signals to identify user location and to control the things, the wearable device 300 may software or hardware-process the beacon signals, include an operating system (OS), such as, for example, an android version 5.0 (Lollipop), and include an application (program), which collects RSSIs of the beacon signal to identify user location in the user space, like the user terminal device 110 illustrated in FIG. 2.

The first communication module 320 receives beacon signals from all the things 400-1, 400-2, . . . in the user space and transmits the received control signals to the HA server 500. The first communication module 320 is implemented as a WiFi communication module, a Bluetooth communication module, a Zigbee communication module, a HomeRF communication module, etc. In addition, the first communication module 320 may be implemented as a short-range communication module, such as a RFID, an IrDA, an UWB, etc.

The first storage 330 stores unlimited data. The first storage 330 is accessed by the first processor 310, which in turn performs reading, writing, modifying, deleting, or updating the data. The data stored in the first storage 330 includes, for example, collected RSSI information of the beacon signals of the things. Of course, the first storage 330 may store an OS, and various applications, image data, additional data, etc., which are executable on the OA.

The first storage 330 may include a storing medium having at least one type of a flash memory type, a hard disk type, a multimedia card micro type, a card type (for example, a SD memory, a XD memory or the like), a RAM, a SRAM, a ROM, an EEPROM, a PROM, a magnetic memory, a magnet disc, or an optical disc.

The things 400-1, 400-2, should be basically configured to be electrically controllable. The things 400-1, 400-2, . . . include second processors 410-1, 410-2, . . . , second communication modules 420-1, 420-2, . . . , and second storages 430-1, 430-2, . . . , respectively. The things 400-1, 400-2, . . . may be implemented in various type, and have the same components or different components. Accordingly, only one thing 400-1 and common components will be described below.

The second processor 410-1 is implemented as a control board in which includes a CPU, a MPU, ASICs, DSPs, DSPDs, PLDs, FPGAs, micro-controllers, microprocessors, etc. The second processor 410-1 controls general operations for all sorts of components of the things 400-1, i.e., the second communication module 420-1 and the second storage 430-1. Of course, the second processor 410-1 may control different components, which are not described herein. The second processor 410-1 controls the second communication module 420-1 to periodically transmit beacon signals, and receives information including control signals from the HA server 500 to control functions of the things 400-1.

The second communication module 420-1 receives information including control signals and beacon signals from the HA server 500 and other things 420-2, 420-3, . . . in the user space and transmits the information including the control signals and the beacon signals to the wearable device 300, the other things 420-2, 420-3, . . . and the HA server 500. The second communication module 420-1 is implemented as a WiFi communication module, a Bluetooth communication module, a Zigbee communication module, a HomeRF communication module, etc. In addition, the second communication module 420-1 may be implemented as a short-range communication module, such as an RFID, an IrDA, a UWB, etc.

The second storage 430-1 stores unlimited data. The second storage 430-1 is accessed by the second processor 410-1, which in turn performs reading, writing, modifying, deleting, or updating the data. The data stored in the second storage 430-1 includes IDs (UUID, major ID, and minor ID) for the thing 400-1, group information for the thing 400-1, user identification information, user terminal device-identification information, HA server-identification information, etc. Of course, the second storage 430-1 stores an OS, and various applications, image data, additional data, etc., which are executable on the OA.

The second storage 430-1 may include a storing medium having at least one type of a flash memory type, a hard disk type, a multimedia card micro type, a card type (for example, a SD memory, an XD memory or the like), a RAM, a SRAM, a ROM, an EEPROM, a ROM, a magnetic memory, a magnet disc, or an optical disc.

The HA server 500 may be implemented as, for example, a computer, a smart phone, a PC, a note book, a PDA, etc.

The HA server 500 may receive beacon signals from the wearable device 300 and transmit control signals to the things 400-1, 400-2, . . . to operate the things 400-1, 400-2, . . . . The HA server 500 includes a third processor 510, a third communication module 520, a third storage 530, a display 540, and a UI generator 550. The HA server 500 may include additional components, such as a signal processor, a user input, and the like, besides the above described components.

The third processor 510 is implemented as a control board in which includes a CPU, a MPU, ASICs, DSPs, DSPDs, PLDs, FPGAs, micro-controllers, microprocessors, etc. The third processor 510 may control general operations of the above described components of the HA server 500, for example, the third communication module 520, the third storage 530, the display 540, the UI generator 550, etc., and software or hardware-process all sorts of beacon signals and the like received from, inputted from and sensed by external apparatus, for example, the things via communication or network. The third processor 510 may include an OS, such as, for example, an android version 5.0 (Lollipop). Also, the third processor 510 includes an application (program), which collects RSSIs of beacon signals transmitted by the things 400-1, 400-2, . . . using the wearable device 300 to identify user location in the user space. The third processor 510 may identify user location in the user space corresponding to a spaces group to which a thing corresponding to a beacon signal having the RSSI of the more than reference value belongs, and control the things belonging to the corresponding spaces group. For example, if identifying that the user with the wearable device 300 in tow is in the room A, the HA server 500 may control the TV installed in the room A or provide information to the TV, thereby allowing the TV to provide service suited to the user.

The third communication module 520 receives beacon signals from all the things 400-1, 400-2, . . . in the user space via the wearable device 300 and transmits information including control signals to all the things 400-1, 400-2, . . . . The third communication module 520 is implemented as a WiFi communication module, a Bluetooth communication module, a Zigbee communication module, a HomeRF communication module, etc. In addition, the third communication module 520 may be implemented as a short-range communication module, such as an RFID, an IrDA, a UWB, etc.

The third storage 530 stores unlimited data. The third storage 530 is accessed by the third processor 510, which in turn performs reading, writing, modifying, deleting, or updating the data. The data stored in the third storage 530 includes, for example, collected RSSI information of the beacon signals of the things, group information for the things, information for grouped things, layout information for grouped things, control information for things according user locations, directions excluded in identifying user location, etc. Of course, the third storage 530 stores an OS, and various applications, image data, additional data, etc., which are executable on the OA. The third storage 530 includes a program (application), which compares RSSIs of the beacon signals collected from the things and identifies as user location in the user space, a space group to which a thing having the largest RSSI within a range of preset standard value belongs.

The third storage 530 may include a storing medium having at least one type of a flash memory type, a hard disk type, a multimedia card micro type, a card type (for example, a SD memory, an XD memory or the like), a RAM, a SRAM, a ROM, an EEPROM, a PROM, a magnetic memory, a magnet disc, or an optical disc.

The UI generator 550 identifies whether RSSI of a beacon signal for a non-grouped thing exceeds a preset size referring to the USSIs of the beacon signals received from the things 400-1. 400-2, . . . and if exceeding, generates a UI, which inputs whether to group the non-grouped thing.

If it is identified that the non-grouped thing is grouped, the UI generator 550 generates a UI, which inputs whether a control for the corresponding thing is essential or optional.

If the user location is identified, the UI generator 550 generates a UI, which checks a selection for thing to be optionally controlled, which is in the space group where the user is located.

If it is identified that the non-grouped thing is grouped, the UI generator 550 generates a UI, which determines user approaching directions excluded in identifying the user location, for example, directions divided by walls to block access. A criterion for directions is directions, which approach the corresponding thing from locations in other space groups.

The display 540 displays information with which provides the user. The display 540 is implemented as a LCD, a LED display, etc. The information provided for the user via the display 540 includes information for things, group information for things, various UIs generated by the UI generator 550, layout distribution for space groups, all sorts of control function keys (buttons) of things, etc.

Figure 5:
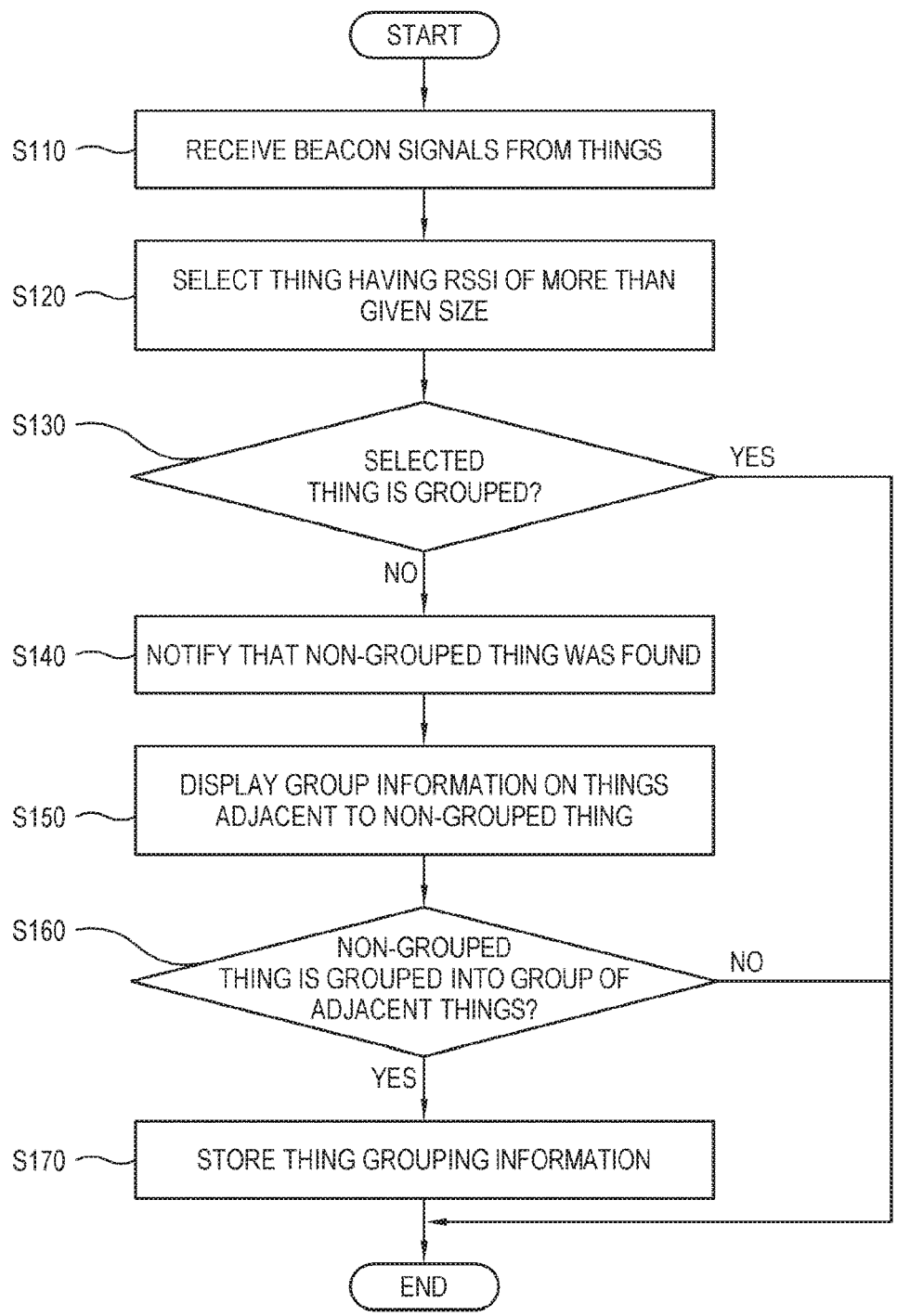
FIG. 5 is a flowchart illustrating a process of grouping things according to an exemplary embodiment.

Hereinafter, a grouping method of things for recognizing user location will be described in detail with reference to FIG. 5.

At an operation S110, beacon signals BS transmitted from the things, which are installed in the user space divided into the plurality of space groups, are received.

At an operation S120, beacon signal(s) having RSSI of more than a preset size are selected from among the received beacon signals. It is convenient to set a size of RSSI for grouping somewhat high, for example, more than −90 dBm. Since the user is more likely to know non-grouped things in substance, it is perfectly fine to set the size of RSSI for grouping high.

At an operation S130, it is identified whether the selected thing are grouped.

If the selected things are grouped, the operation is ended.

If the selected things are non-grouped things, at an operation S140, the user is notified that the non-grouped things are found.

At an operation S150, group information for things adjacent to the non-grouped things is displayed. If there is no information for adjacent things, a group is directly designated.

At an operation S160, it is checked up whether to group the non-grouped things into a group of adjacent things. If the user does not select the grouping, the operation is ended. This is a case that group information for adjacent things is not appropriate and at this time, the user has to directly select and designate the group.

At an operation S170, if the user selects the grouping by selecting the group of adjacent things, group information for corresponding things is stored. If selecting the grouping, as illustrated in FIG. 6, it is able for the user to designate whether the things to be grouped is essential control subjects or optional control subjects. Since in user location recognition in new space group, if it is night, a light should be essentially turned on, the light is designated as essential control subject. On the other hand, a thing, such as an oven, controllable only when the user wants is determined and designated as optional control subject.

Also, at a next operation, as illustrated in FIG. 7, a UI, which inquiries whether to set up user approach excluding directions excluded in identifying user location for the grouping subject things, is displayed. The user knows locations and surrounding environments of the grouping subject things. If the user selects a setting, as illustrated in FIG. 8, a direction list, which allows the user to select approaching directions, is displayed. If the user checks approaching directions she or he expects to generate errors from the displayed list, the checked approaching directions are stored to reflect in later user location recognition. In other words, even if the set-up things correspond to user location recognition conditions and RSSIs within preset reference value, the set-up things may be excluded from identifying user location referring to the stored excluding directions information. Accordingly, if the user does not pass in specific directions due to walls, specific directions, which approach corresponding things, may be excluded.

Figure 9:
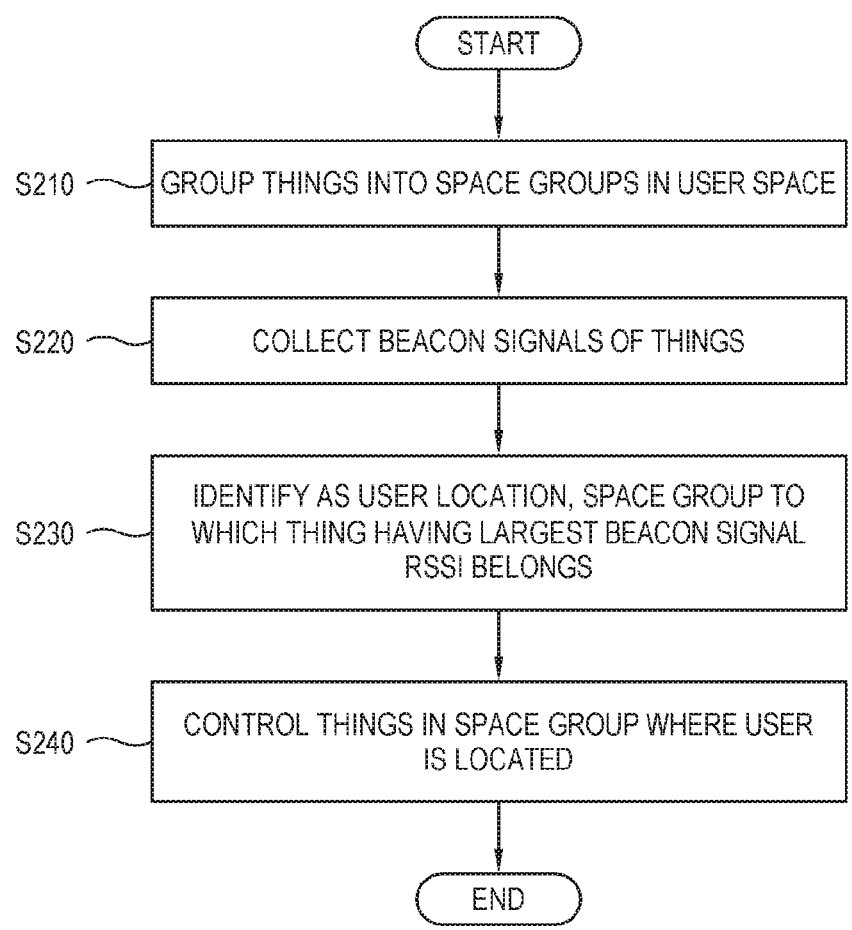
FIG. 9 is a flowchart illustrating a process of recognizing a user location in a user space according to an exemplary embodiment.

A user location recognition method will be described in detail with reference to FIG. 9.

At an operation S210, things are grouped into the plurality of space groups in the user space. The grouping method is performed as illustrated in FIG. 5.

At an operation S220, beacon signals are collected from all of the things in the user space to store RSSIs of the beacon signals.

At an operation S230, a beacon single having RSSI of more than a reference value is selected from among all the stored RSSIs of the beacon signals. Since a beacon signal having the largest RSSI always exists, performing the user location recognition process at all times is unreasonable. Also, the reference value of RSSI may be differently set depending on areas of space groups to which the things belong. Reference values of RSSI for space groups may be set as reference values, for example, more than −80~−99 dBm, of beacon signal RSSI of things, which when identifying grouping in initial thing grouping process, are applied to user location recognition in corresponding space groups. In other words, this process is to identify user location recognition ranges of space groups. For example, if an area is large as in the living room, the reference value of RSSI is selected widely by −80~−99 dBm, and if small as in the bathroom room, narrowly by −90~−99 dBm, thereby preventing errors in the user location recognition.

At an operation S240, if the user location is identified, the things belonging to a space group corresponding to the corresponding location are controlled. The user location recognition is divided into location identification that the user location is identified when the user moves from one space group to another new space group and location identification that the user location is repetitively identified in the same space group. If the user location is identified when the user moves to the new space group, essential control things are first operated and then information for optional control things is displayed. Here, the user may select things and perform control for the selected things. Likewise, if the user location is repetitively identified in the same space group, information for all the things in the space group is displayed and thereby the user may select things and perform control for the selected things. Of course, in this case, if being set in advance, essential control things may be first operated and then information for optional control things may be displayed, so that the user may select things and perform control for the selected things. If there is no essential control thing in the location-identified space group, only information for optional control things is displayed. Also, If there are more than two essential control things, the more than two essential control things may be operated in given time intervals or alternatively.

Figure 10:
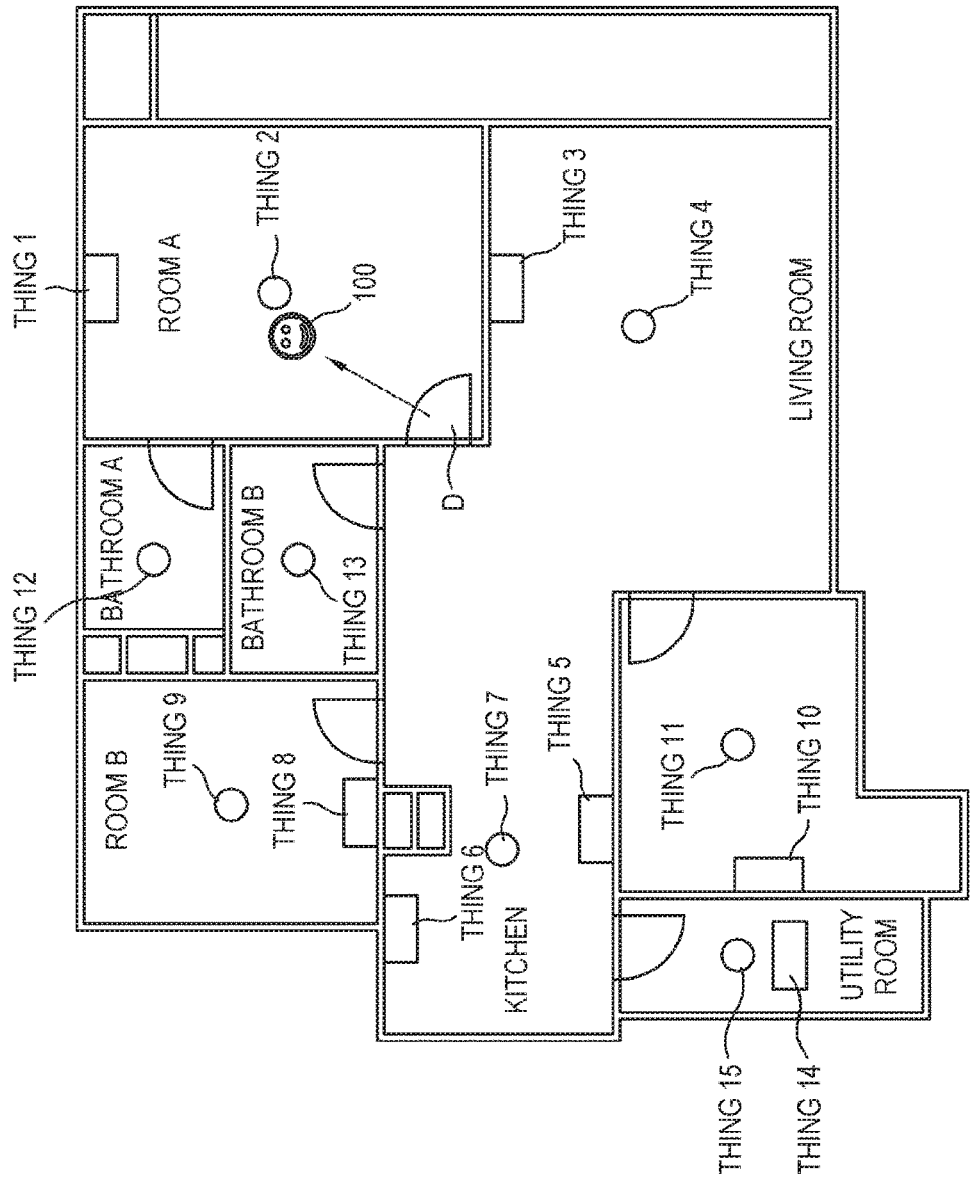
FIG. 10 is a mimetic diagram illustrating configuration of IoT in a user residential space divided in a plurality of space groups.

FIG. 10 is a mimetic diagram illustrating configuration of IoT 1 in a user residential space divided in a plurality of space groups.

As illustrated in FIG. 10, in a space group room A are installed a thing 1 (TV 1) and a thing 2 (light 1), in a space group living room are installed a thing 3 (TV 2) and a thing 4 (light 2), in a space group kitchen are installed a thing 5 (refrigerator), a thing 6 (oven) and a thing 7 (light 3), in a space group room B are installed a thing 8 (PC 1) and a thing 9 (light 4), in a space group room C are installed a thing 10 (PC 2) and a thing 11 (light 5), in a space group bathroom A is installed a thing 12 (light 6), in a space group bathroom B is installed a thing 13 (light 7), and in a space group utility room are installed a thing 14 (washing machine) and a thing 15 (light 8). The things are connected to network to communicate with one another. As described with reference to FIG. 5, the things are grouped according to space groups. If user does activities in space groups with a user terminal device 100 in tow, the user terminal device 100 may receive beacon signals from the things in the space groups. In FIG. 10, the user terminal device 100 (user) is located near the thing 2 (light 1) in the room A. FIG. 11 is a table illustrating measured values of RSSIs collected when the user terminal device 100 (the user) is in the space group room A. Here, things, which transmit beacon signals having RSSI within a standard value −80~−90 dBm from among beacon signals received by the user terminal device 100, are the thing 1 (TV 1) and the thing 2 (light 1) and the close thing 2 (light 1) is identified as a things having the largest RSSI. Accordingly, the space group room A is recognized as a space location of the user terminal device 100 (user) in the user space. Resultantly, in FIG. 10, if the user terminal device 100 (user) opens the door D and enters the room A, the user terminal device 100 will recognize as the user location, the room A, which is a space group of the thing 2 (light 1), and turn on the light 1. Of course, the light 1 may be operated to turn on only at fixed times (night). At the same time, the user terminal device 100 displays information about optional control for the thing 1 (TV 1) on the display.

Figure 12:
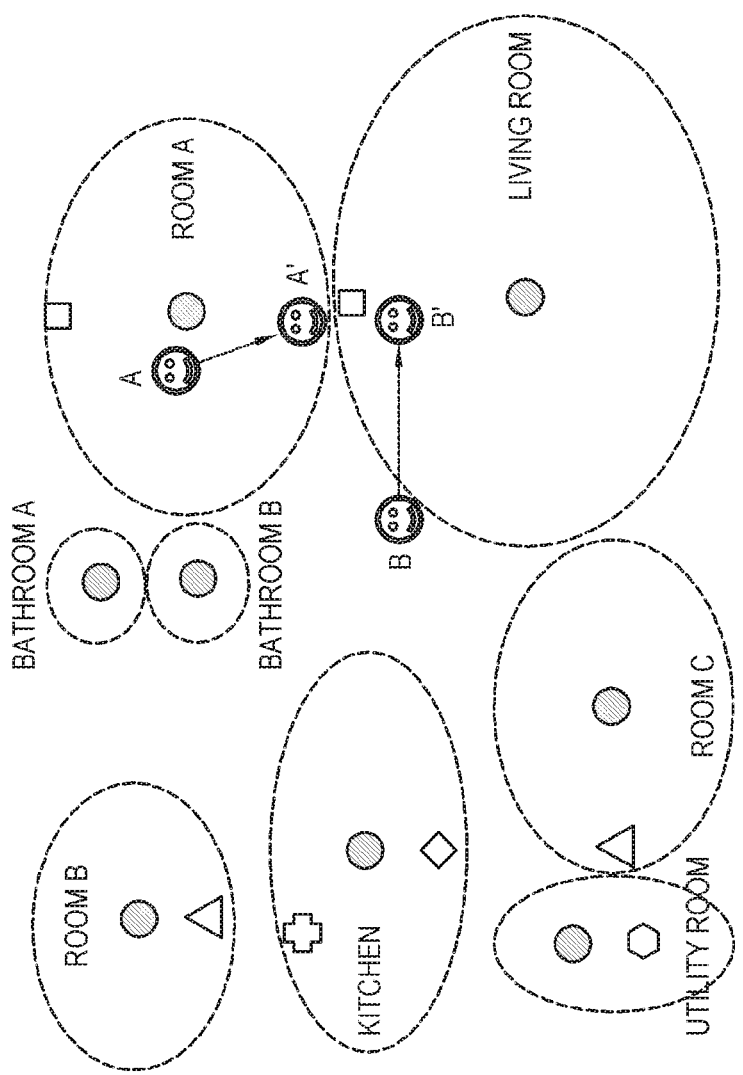
FIG. 12 is a view illustrating a layout for the things and space groups through changes in RSSI of the beacon signals of the things according to user movement in the user space.

FIG. 12 is a view illustrating a layout for things and space groups based on changes in RSSI of beacon signals of the things collected when the user terminal device 100 moves in the user space composed of the plurality of space groups. Only by RSSIs of the beacon signals of the things, it is difficult to measure distances between the things, but possible to roughly estimate locations and directions of the things and the space groups.

FIG. 13 is a table illustrating RSSIs of the beacon signals of the things, which are changed when the user terminal device 100 (user) moves from allocation A to a location A'. As illustrated in FIG. 13, it may be appreciated that things of which the RSSI of the beacon signal is largely changed when the user terminal device 100 (user) moves to the location A' are the thing 1 (TV 1) and the thing 2 (light 2) in the room A and the thing 3 (TV 2) and the thing 4 (light 2) in the space group living room. Accordingly, it may be figured out that the room A and the living room are adjacent each other. As described above, if analyzing changes, for example, increase and decrease, and difference in size for the RSSIs of the beacon signals of the things repetitively and in different directions in the space groups, schematic layouts for the space groups may be identified. Accordingly, the user needs to simply group the things and does not need to separately set up the layouts for the space groups.

In FIG. 12, when the user moves from the location A to the location A', the user is located in the room A in substance, but recognized as being located in the living room since the thing 3 (TV 2) has a beacon signal in which the RSSI satisfies a reference value of −80~−90 dBm and measures the largest value, thereby resulting in error to control the things (TV 2, light 2) in the living room. Accordingly, for things located on boundaries between the space groups, it is preferably to set directions excluding in user location recognition. A standard of setting the directions excluding in user location recognition is a layout for things and space groups identified by the user terminal device 100 when explaining the thing grouping process with reference to FIG. 5. In other words, since the thing 3 (TV 2) in the living room is near a wall W, which is a border of the room A, directions approaching from the room A, for example, a direction where RSSIs of beacon signals of the thing 1 (TV 1) and the thing 2 (light 1) are sharply decreased, in addition, directions where RSSIs of beacon signals of the thing 12 in the bathroom A, the thing 13 in the bathroom B, and the things 8 and 9 in the room B are decreased, respectively, may be excluded. If a thing is located near a center enough away from walls of the space group or it is difficult to approach the thing due to an outer wall, it is unnecessary to set the directions excluding in user location recognition. In other words, it is perfectly all right to set the directions excluding in user location recognition only when the things are located on the borders between the space groups.

Figure 14:
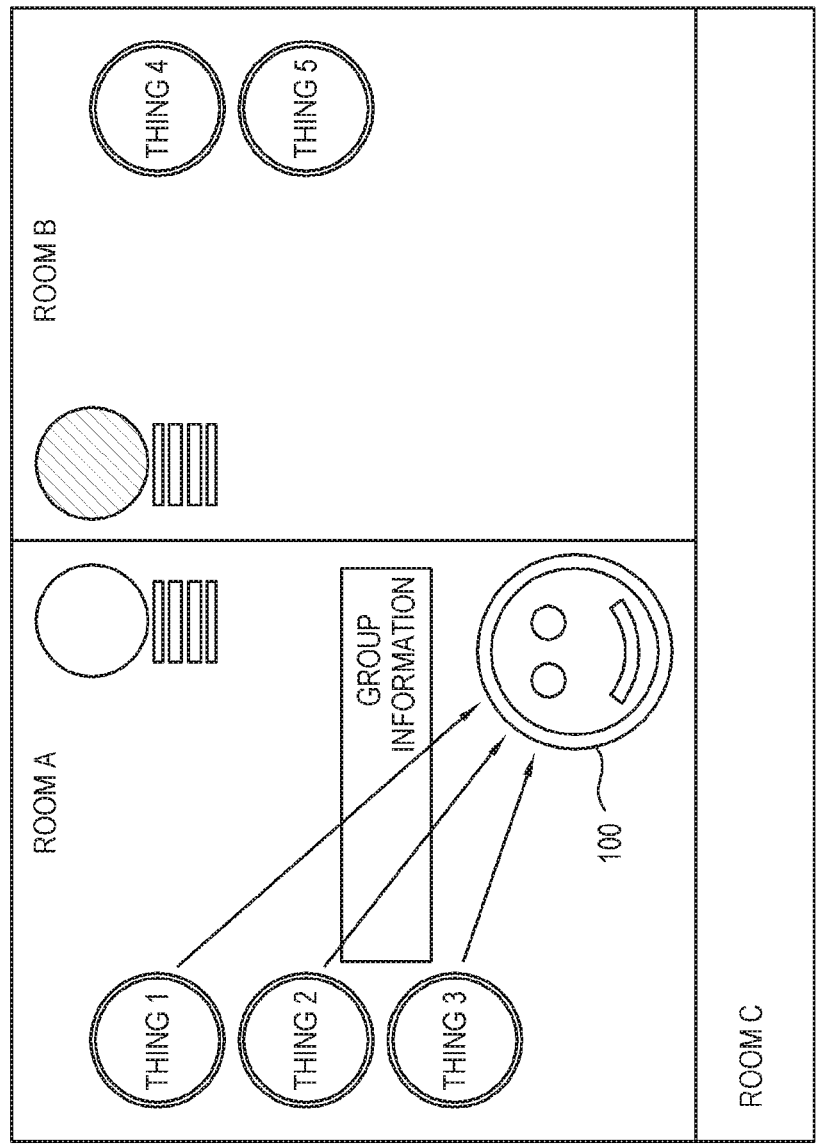
FIG. 14 is a view illustrating an example of controlling the things using user location recognition according to an exemplary embodiment.

FIG. 14 is a view illustrating an example of controlling the things through user location recognition according to an exemplary embodiment. As illustrated in FIG. 14, the user enters a room A with a smart phone 100 in tow. The smart phone 100 has a function (application), which can collect RSSIs of beacon signals and recognize user location based on the collected RSSIs of beacon signals when the user approaches grouped things. The smart phone 100 may check up on a thing 3 having a beacon signal of RSSI of more than a preset reference value in the room A. Accordingly, the smart phone 100 recognizes that the user is in a room A, and turns on only a light installed in the room A from among a plurality of lights installed indoors.

Figure 15:
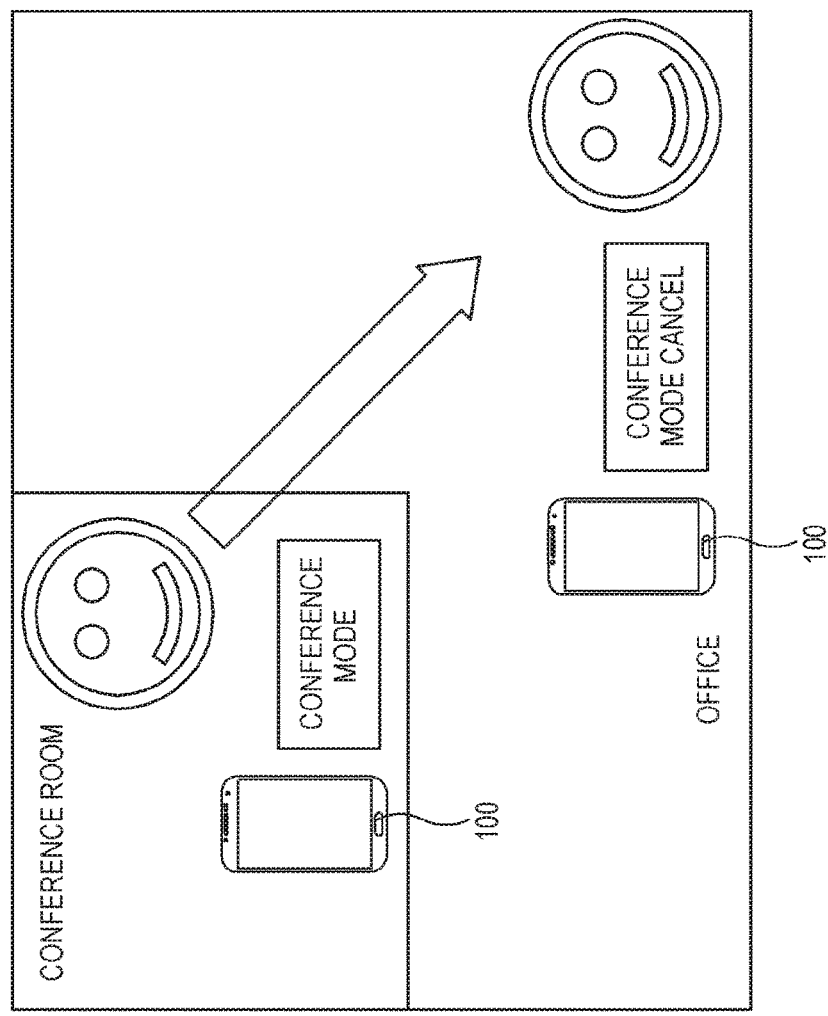
FIG. 15 is a view illustrating another example of controlling the things using the user location recognition according to an exemplary embodiment.

FIG. 15 is a view illustrating another example of controlling the things through the user location recognition according to an exemplary embodiment. As illustrated in FIG. 15, the user enters the conference room with a smart phone 100 in tow. The smart phone 100 has a function (application) capable of recognizing user location. The smart phone 100 may check up on a light or a projector having a beacon signal of RSSI of more than a given standard value in the conference room. Accordingly, the smart phone 100 turns on only the light installed in the conference room from among a plurality of lights installed indoors, and changes a mode of the smart phone 100 into a conference mode. On the other hand, if the user goes out of the conference room, the smart phone 100 cancels the conference mode when recognizing things having beacon signals of RSSI within the given standard value from among many things in an office thereby to recognize that the user is in the office. Of course, the smart phone 100 should be set to change the mode to the conference mode when the user is in the conference room and to cancel the conference mode when the user is outside of the conference room.

Figure 16:
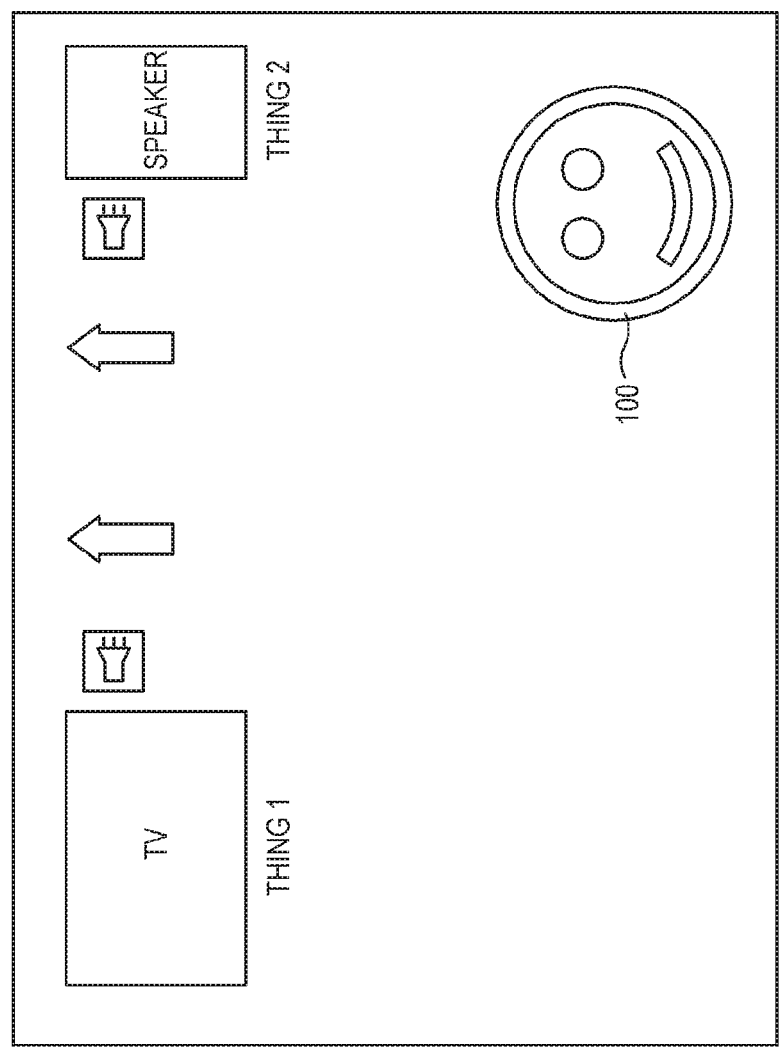
FIG. 16 is a view illustrating other example of controlling the things using the user location recognition according to an exemplary embodiment.

FIG. 16 is a view illustrating other example of controlling the things through the user location recognition according to an exemplary embodiment. As illustrated in FIG. 16, the user is located in a room C with a smart phone 100 in tow. The smart phone 100 has a function (application) capable of recognizing user location. Here, the user with the smart phone 100 in tow is advanced in age and relatively not good in hearing. The smart phone 100 recognizes that the user (the aged) is in the room C through RSSI of a beacon signal of the thing 1 (TV) or the thing 2 (speaker) in the room C. The user may set suitable volume level she can listen with respect to the thing 1 (TV) or the thing 2 (speaker) or operate in previously set state. In other words, the smart phone 100 may control conditions of the things to be optimized for the user. For example, the TV may provide categories, such as programs, channels, movies, sports, etc., the user likes. If it is recognized that a plurality of users is located in the room C, users' priority should be set to control the things. In other words, the plurality of users in the room C is prioritized. Things, such as a light and the like, may be set to be controllable in common. Also, specific things, such as a PC, a TV and the like, may be set to be controlled to suit dedicated users. In the same manner, dangerous things for children may be set to safe mode. Also, the things may be set to be controlled to suit disabled persons.

While the exemplary embodiments have been shown and described with reference to various embodiments thereof, it will be understood by those skilled in the art that various changes in form and details may be made therein without departing from the present disclosure.

Operations according to the various exemplary embodiments as described above will be implemented by a single processor or a plurality of processors. In this case, program commands for performing operations, which are implemented as various computers, may be recorded in a computer-readable medium. The computer-readable medium may include program commands, data files, data structures, etc. alone or in combination. The program commands may be commands specially designed and constructed for the present disclosure or commands known to and usable by those skilled in the art. As examples, the computer-readable medium includes a magnetic medium, such as a hard disc, a floppy disc and a magnetic tape, an optical recording medium, such as a CD-ROM or a DVD, a magnetic-optical medium, such as a floptical disk, a hardware device, such as a ROM, a RAM, a flash memory or the like, which is specially constructed to store and perform the program commands. As examples, the program commands include high-level language codes executable by the computer using an interpreter or the like, as well as machine language codes made by a compiler. If all or part of base station or relay described in the present disclosure is implemented as computer programs, a computer-readable recording medium in which the computer programs are recorded is also included in the present disclosure.

Accordingly, the scope of the present disclosure is not limited to the exemplary embodiments as described above and should be defined by the appended claims and their equivalents.

INDUSTRIAL APPLICABILITY

In the IoT environment, the user location may be checked up to provide proper service.

The invention claimed is:

1. A user terminal device for recognizing a user location comprising:
    a display;
    a communication module configured to receive beacon signal information from a plurality of things grouped into a plurality of space groups; and
    a processor configured to identify as a user location in a user space, a space group to which a thing corresponding to a beacon signal having a received signal strength indicator (RSSI) of more than a reference value from among RSSIs of a plurality of beacon signals received from the plurality of things belongs, based on the beacon signal information,
    wherein the processor is configured to, in response to the thing corresponding to the beacon signal having the RSSI of more than the reference value being a non-grouped thing, which is not grouped into the plurality of space groups, control the display to display a user interface (UI) for grouping the non-grouped thing into a group of things adjacent to the non-grouped thing.

2. The user terminal device according to claim 1, wherein the reference value is set to be different according to an area of the space group to which the thing corresponding to the beacon signal having the RSSI of more than reference value belongs.

3. The user terminal device according to claim 1, wherein the processor is configured to identify a layout for things in the user space based on changes in RSSI of beacon signals of the things, which are changed according to user movement.

4. The user terminal device according to claim 3, wherein the processor is configured to identify a direction of the user movement between the space groups based the changes in RSSI of beacon signals.

5. The user terminal device according to claim 1, wherein the communication module comprises one of a Bluetooth communication module, a Zigbee communication module, a wireless fidelity (WiFi) communication module, or Home radio frequency (HomeRF) communication module.

6. The user terminal device according to claim 1, wherein the processor is configured to control the display to display a control UI for controlling at least one of things belonging to the space group of the identified user location.

7. The user terminal device according to claim 6, further comprising a storage,
    wherein the processor is configured to store in the storage, thing status information of the space group in which a user are located, according to times and users.

8. The user terminal device according to claim 1, wherein when a user is in a new space group according to the user location identification, the processor is configured to provide a user with information on things in the new space group.

9. The user terminal device according to claim 8, wherein the processor is configured to control the display to display a UI for setting up essential control things and optional control things.

10. The user terminal device according to claim 1, wherein the processor is configured to control the things according to a user of priority in response to locations of a plurality of users being identified at the same time.

11. A thing controlling system for controlling things according to a user location, comprising:
    a mobile device having a first communication module configured to receive beacon signal information from a plurality of things grouped into a plurality of space groups; and
    a user terminal device having a processor configured to identify as a user location in a user space, a space group to which a thing corresponding to a beacon signal having a received signal strength indicator (RSSI) of more than a reference value from among RSSIs of a plurality of beacon signals received from the plurality of things belongs, based on the beacon signal information, and to transmit a control signal for operating things in the space group in which a user is located,
    wherein the user terminal device, in response to the thing corresponding to the beacon signal having the RSSI of more than the reference value being a non-grouped thing, which is not grouped into the plurality of space groups, displays on a display a user interface (UI) for grouping the non-grouped thing into a group of things adjacent to the non-grouped thing.

12. A method for recognizing a user location, comprising:
    grouping a plurality of things according to space groups in a user space;
    collecting beacon signals from the plurality of things;
    identifying as a user location in a user space, a space group to which a thing corresponding to a beacon signal having a received signal strength indicator (RSSI) of more than a reference value from among RSSIs of the beacon signals belongs, and
    in response to the thing corresponding to the beacon signal having the RSSI of more than the reference value being a non-grouped thing, which is not grouped into the plurality of space groups, displaying on a display a user interface (UI) for grouping the non-grouped thing into a group of things adjacent to the non-grouped thing.

13. A recording medium including a program, which, according to claim 12, collects beacon signals of things grouped into a plurality of space groups, identifies as a user location, a space group to which a thing corresponding to a beacon signal having a received signal strength indicator (RSSI) of more than a reference value from among the collected beacon signals belongs, and, in response to the thing corresponding to the beacon signal having the RSSI of more than the reference value being a non-grouped thing, which is not grouped into the plurality of space groups, displays on a display a user interface (UI) for grouping the non-grouped thing into a group of things adjacent to the non-grouped thing.

* * * * *